United States Patent Office

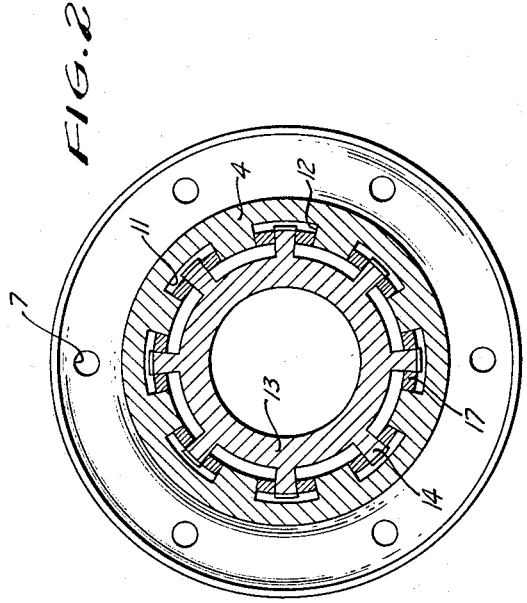
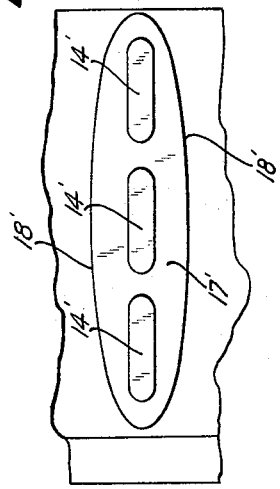
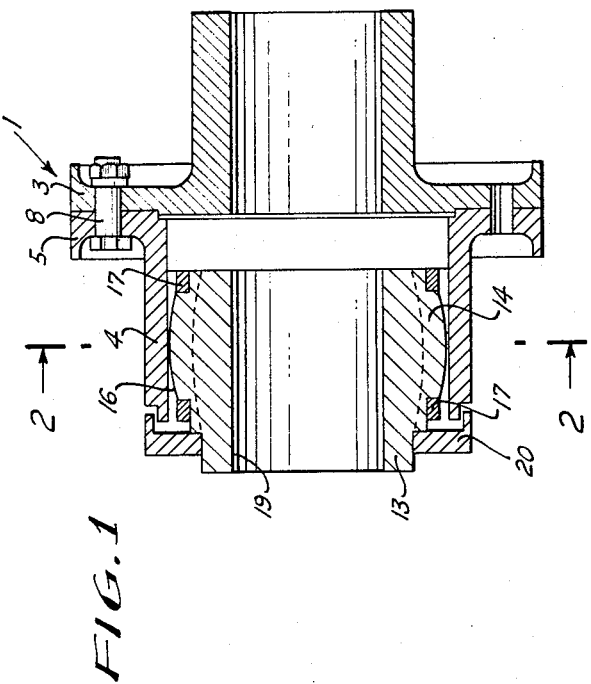
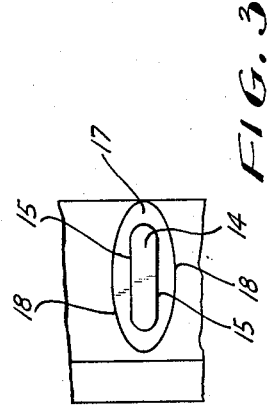

3,411,323
Patented Nov. 19, 1968

3,411,323
ELASTIC COUPLING
Heinrich Nehl, Peine, Hannover, Germany, assignor to Kerkhoff & Co., Wolfenbuttel, Germany
Filed Mar. 15, 1967, Ser. No. 624,661
Claims priority, application Germany, Sept. 12, 1966, K 55,482
5 Claims. (Cl. 64—14)

ABSTRACT OF THE DISCLOSURE

An elastic coupling mainly comprising a first tubular coupling member provided at the inner surface with a plurality of axially extending grooves having substantially parallel side faces, a second substantially cylindrical coupling member extending into the first tubular coupling member and provided at the outer surface with a plurality of teeth respectively located with ample lateral clearance in the aforementioned grooves, and an endless jacket of elastic material surrounding each tooth, the side faces of each jacket respectively facing the side faces of the respective groove are curved in axial direction so that each jacket has its greatest width substantially midway between opposite ends of the respective tooth and engages the side faces of the respective groove in the region of the aforementioned greatest width.

Background of the invention

Elastic couplings provided with axially extending teeth are known in which each tooth is surrounded with an annular ring of elastic material mounted thereon so as to provide an elastic engagement of the tooth with grooves fromed in the coupling member surrounding the first mentioned coupling member.

Such elastic couplings have provided excellent results especially in heavy reversible drives for rolling mills or the like, because it is possible to provide such couplings with relatively large elastic masses, for instance rubber, so as to provide a corresponding high elasticity of the coupling. In such couplings the elastic masses can be arranged located closely adjacent to the axis of the coupling so that the masses are subjected to relatively small centrifugal forces. In addition, the elastic jacket surrounding each tooth provides large abutting faces for transmitting the force from one to the other coupling member so that the elastic material is not unduly stressed and so that the coupling will stand up during extensive use. In addition, such couplings may be easily engaged and disengaged by axially displacing the coupling members and the jackets surrounding each tooth are arranged in such a manner so as to be not damaged during axial displacing of the coupling members.

In known elastic couplings of the aforementioned type the cross-sections of the elastic jackets were substantially uniform over the whole length thereof, that is the jackets had substantially parallel side faces, which required that the shaft ends to be coupled by the coupling had to be substantially aligned with each other.

It is an object of the present invention to provide an elastic coupling of the aforementioned kind which permits a deviation from the proper axial alignment of the two shafts to be coupled with each other.

It is a further object of the present invention to provide an elastic coupling of the aforementioned kind which is composed of relatively few and simple parts constructed and arranged with respect to each other to assure a long useful life of the coupling.

Summary of the invention

With these objects in view, the elastic coupling according to the present invention mainly comprises a first tubular coupling member provided at the inner surface thereof with a plurality of axially extending grooves having substantially parallel side faces, a second substantially cylindrical coupling member extending into the first tubular coupling member and provided at the peripheral surface thereof with a plurality of teeth respectively located with ample lateral clearance in the grooves and an endless jacket of elastic material surrounding each tooth and having side faces respectively facing the side faces of the respective groove and being curved in axial direction so that each jacket has its greatest width substantially midway between opposite ends of the respective tooth and engages the side faces of the respective groove in the region of this greatest width.

If the coupling is relatively long, each tooth may comprise a plurality of tooth sections spaced in axial direction from each other and in this case each of the jackets has integral portions extending between and filling the spaces between adjacent tooth sections.

Due to the curved configuration of the side faces of the elastic jacket it is possible to use the elastic coupling according to the present invention to join a pair of shaft ends which are not properly aligned with each other and in which the axes of the shafts deviate from each other through an angle of 7–10 degrees. In elastic couplings according to the prior art maximum deviations of the shaft axes of two degrees were permissible, while the coupling of the present invention will still work perfectly with deviations of 7–10 degrees. The coupling teeth itself may have parallel side faces so that they may be easily machined.

The novel features which are considered as characteristic for the invention are set forth in particular in the appended claims. The invention itself, however, both as to its construction and its method of operation, together with additional objects and advantages thereof will be best understood from the following description of specific embodiments when read in connection with accompanying drawings.

Brief description of the drawing

FIG. 1 is an axial cross-section through an embodiment of a coupling according to the present invention;

FIG. 2 is a cross-section taken along the line 2—2 of FIG. 1, viewed in the direction of the arrows;

FIG. 3 is a partial top view of the second coupling member and showing one tooth and the elastic jacket surrounding the same; and FIG 4 is a partial top view similar to FIG. 3 and showing a modification in which the tooth is formed by a plurality of tooth sections.

Description of the preferred embodiments

Referring now to the drawings and more specifically to FIG. 1–3 of the same, it will be seen that the elastic coupling according to the present invention comprises a first tubular coupling member 1 having a first tubular part 2 formed in the region of one end thereof with an annular radially outwardly extending flange 3, and a second tubular part 4 having at one end thereof a radially outwardly extending flange 5 abutting with an end face thereof against the annular flange 3 of the first part 2. The flanges 3 and 5 are formed with a plurality of circumferentially spaced and respectively aligned bores 7 therethrough and a plurality of screws 8 extending respectively through the bores 7 and a washer 9 as well as a nut 10 at the threaded ends of the screws 8 are provided to secure the two flanges to each other. As can be seen from FIG. 1, part 4 has an inner diameter greater than the aprt 2 and the part 4 is formed at the inner surface thereof with a plurality of axially extending grooves 11 having substantially parallel side faces 12.

The coupling includes further a second substantially cylindrical coupling member 13 provided at the outer peripheral surface thereof with a plurality of axially extending teeth 14 which are circumferentially spaced from each other and respectively located with ample clearance in the grooves 11. The side faces 15 of the teeth 14 are substantially parallel whereas the faces 16 of the teeth which face the bottom faces of the respective grooves have a substantially spherical configuration.

Each of the teeth 14 is surrounded by an endless jacket 17 of elastic material, for instance rubber, and according to the present invention, the side faces 18 of each jacket 17 which respectively face the side faces 12 of the respective groove 11 are curved in axial direction so that each jacket 17 has its greatest width substantially midway between opposite ends of the respective tooth and engages the side faces 12 of the respective groove in the region of the aforementioned greatest width.

The second coupling member is formed with an axial bore 19 therethrough which may have an inner diameter substantially equal to the inner diameter of the first part 2 of the first coupling member. The second coupling member extends with the toothed portion thereof into part 4 of the first coupling member, and an annular member 20 may be provided on the portion of the second coupling member located outside the first coupling member to prevent or at least reduce penetration of dust and other impurities into the grooves of the first coupling member.

FIG. 4 is a partial top view similar to FIG. 3 and showing a slight modification according to which each tooth comprises a plurality of tooth sections 14′ axially spaced from each other and each jacket 17′ integrally surrounds the tooth sections 14′ and the jacket has integral portions extending between and filling the spaces between adjacent tooth sections. The jacket 17′ has likewise side faces 18′ which are curved in axial direction.

It will be understood that each of the elements described above, or two or more together, may also find a useful application in other types of elastic coupling differing from the types described above.

While the invention has been illustrated and described as embodied in an elastic coupling with an endless jacket of elastic material surrounding the teeth on one coupling element and having curved side faces, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What I claim as new and desire to be protected by Letters Patent is:

1. An elastic coupling comprising, in combination, a first tubular coupling member provided at the inner surface thereof with a plurality of axially extending grooves having substantially parallel side faces; a second substantially cylindrical coupling member extending into said first tubular coupling member and provided at the peripheral surface thereof with a plurality of teeth respectively located with ample lateral clearance in said grooves; and an endless packet of elastic material surrounding each tooth, the side face of each jacket respectively facing the side faces of the respective groove being curved in axial direction so that each jacket has its greatest width substantially midway between opposite ends of the respective tooth and engages the side faces of the respective groove in the region of said greatest width.

2. An elastic coupling as defined in claim 1, wherein the face of each tooth facing the inner surface of said tubular coupling member is substantially spherical.

3. An elastic coupling as defined in claim 1, wherein the side faces of said teeth are substantially parallel.

4. An elastic coupling as defined in claim 1, wherein each tooth comprises a plurality of tooth sections spaced in axial direction from each other, and wherein each jacket has integral portions extending between and filling the spaces between adjacent tooth sections.

5. An elastic coupling as defined in claim 1, wherein said first tubular coupling member comprises a first part having a radial flange at one end, a second part of larger inner diameter than said first part and having a radial flange at one end abutting against said radial flange of said first part, and screw means connecting said flanges to each other, only said second part being provided with said grooves and said second coupling member extending only into said second part.

References Cited

UNITED STATES PATENTS

| | | | |
|---|---|---|---|
| 2,394,448 | 2/1946 | Herold et al. | 64—14 |
| 2,544,194 | 3/1951 | Vanderzee | 64—9 |
| 3,045,763 | 7/1962 | Perrott | 64—27 X |
| 3,321,935 | 5/1967 | Wildhaber | 64—9 |

FOREIGN PATENTS

| | | |
|---|---|---|
| 1,081,306 | 6/1954 | France. |

HALL C. COE, *Primary Examiner.*